United States Patent
Samdanis et al.

(10) Patent No.: US 9,794,049 B2
(45) Date of Patent: Oct. 17, 2017

(54) METHOD FOR RESOURCE MANAGEMENT IN A CELLULAR COMMUNICATION NETWORK AND RESOURCE MANAGEMENT SYSTEM

(75) Inventors: Konstantinos Samdanis, Dossenheim (DE); Peter Rost, Dresden (DE); Long Le, Dossenheim (DE)

(73) Assignee: NEC CORPORATION, Tokyo (JP)

( * ) Notice: Subject to any disclaimer, the term of this patent is extended or adjusted under 35 U.S.C. 154(b) by 574 days.

(21) Appl. No.: 14/235,195

(22) PCT Filed: Jul. 24, 2012

(86) PCT No.: PCT/EP2012/064525
§ 371 (c)(1),
(2), (4) Date: Feb. 25, 2014

(87) PCT Pub. No.: WO2013/014169
PCT Pub. Date: Jan. 31, 2013

(65) Prior Publication Data
US 2014/0153454 A1    Jun. 5, 2014

(30) Foreign Application Priority Data

Jul. 26, 2011 (EP) ..................................... 11006118

(51) Int. Cl.
*H04L 5/14* (2006.01)
*H04W 52/24* (2009.01)
(Continued)

(52) U.S. Cl.
CPC .............. *H04L 5/14* (2013.01); *H04L 5/0037* (2013.01); *H04L 5/1469* (2013.01);
(Continued)

(58) Field of Classification Search
CPC ....................................................... H04L 5/14
(Continued)

(56) References Cited

U.S. PATENT DOCUMENTS

| 2009/0249153 A1* | 10/2009 | Zhang ................... | H04L 1/1887 714/748 |
|---|---|---|---|
| 2013/0315115 A1 | 11/2013 | Kim et al. | |
| 2014/0146750 A1* | 5/2014 | Kim .................... | H04W 52/146 370/328 |

FOREIGN PATENT DOCUMENTS

| EP | 1278388 A2 | 1/2003 |
|---|---|---|
| EP | 2456266 A1 | 5/2012 |

(Continued)

OTHER PUBLICATIONS

"combination of D-TDD and S-TDD based on adaptive power control" by Lee, Sep. 2008.*
(Continued)

*Primary Examiner* — Shaq Taha
*Assistant Examiner* — Pamit Kaur
(74) *Attorney, Agent, or Firm* — Young & Thompson

(57) ABSTRACT

A method for resource management in a cellular communication network, wherein the network includes at least one base station per cell for a plurality of cells that operates in TDD (Time Division Duplex) transmission mode, wherein the base stations implement a respective UL/DL configuration mode in which frames are composed of a specific sequence of downlink DL, uplink UL and special S subframes, is characterized in that the base stations are operated such that neighboring base stations with adjacent and/or overlapping coverage areas employ different UL/DL configuration modes, wherein interference between neighboring base stations is taken account of by implementing power control on a subframe basis. Furthermore, a resource management system for use in a cellular communication network is described.

22 Claims, 3 Drawing Sheets

Figure 1:
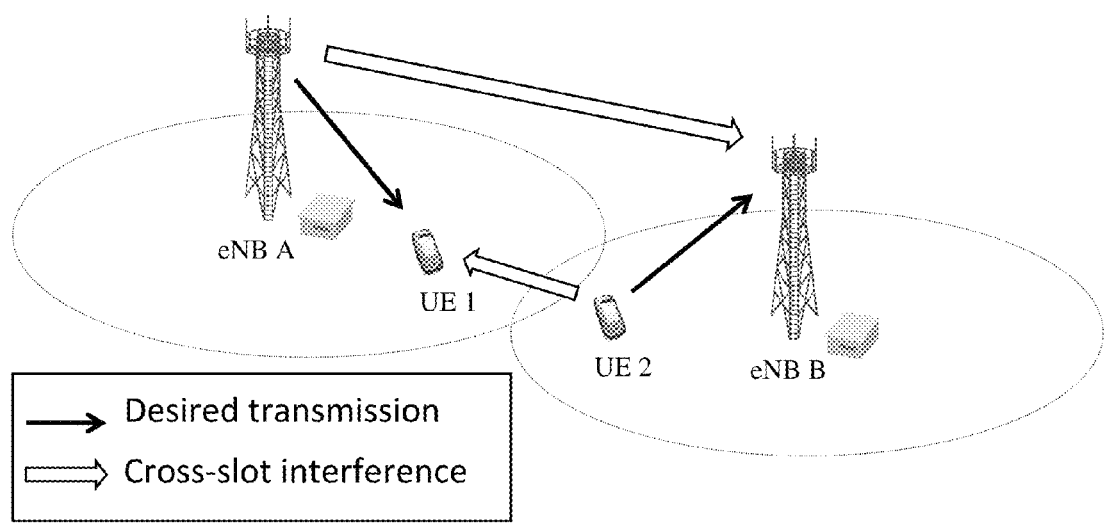

(51) Int. Cl.
*H04L 5/00* (2006.01)
*H04W 16/12* (2009.01)
*H04W 52/14* (2009.01)

(52) U.S. Cl.
CPC ......... *H04W 52/14* (2013.01); *H04W 52/243* (2013.01); *H04W 16/12* (2013.01); *H04W 52/143* (2013.01)

(58) Field of Classification Search
USPC .......................................................... 370/280
See application file for complete search history.

(56) References Cited

FOREIGN PATENT DOCUMENTS

| EP | 2282591 B1 | 9/2012 |
|---|---|---|
| JP | 2003032734 A | 1/2003 |
| JP | 2011015404 A | 1/2011 |
| JP | 2011512097 A | 4/2011 |
| JP | 2011517896 A | 6/2011 |
| JP | 2011521500 A | 7/2011 |
| WO | 2009100371 A2 | 8/2009 |
| WO | 2009120701 A2 | 10/2009 |
| WO | 2009120934 A1 | 10/2009 |
| WO | 2011007576 A1 | 1/2011 |
| WO | 2013/168467 A1 | 11/2013 |

OTHER PUBLICATIONS

European Office Action issued in Application No. 12 748 403.8-1855, dated Nov. 30, 2016.
International Search Report dated Sep. 27, 2012, corresponding to PCT/EP2012/064525.
Howon Lee, et al.; "Combination of Dynamic-TDD and Static-TDD Based on Adaptive Power Control"; Vehicular Technology Conference, Sep. 21, 2008; pp. 1-5; XP031352570.
J. Nasreddine, et al.; Performance of TD-CDMA Systems During Crossed Slots; 2004 IEE 60th Vehicular Technology Conference; vol. 2; Sep. 26, 2004; pp. 798-802; XP010788499.

\* cited by examiner

METHOD FOR RESOURCE MANAGEMENT IN A CELLULAR COMMUNICATION NETWORK AND RESOURCE MANAGEMENT SYSTEM

The present invention relates to a method for resource management in a cellular communication network, wherein said network includes at least one base station per cell for a plurality of cells that operates in TDD (Time Division Duplex) transmission mode, wherein said base stations implement a respective UL/DL configuration mode in which frames are composed of a specific sequence of downlink DL, uplink UL and special S subframes.

Furthermore, the present invention relates to a resource management system for use in a cellular communication network, wherein said network includes at least one base station per cell for a plurality of cells that operates in TDD (Time Division Duplex) transmission mode, wherein said base stations are configured to implement a respective UL/DL configuration mode in which frames are composed of a specific sequence of downlink DL, uplink UL and special S subframes.

Time Division Duplex (TDD) is a transmission mode supported both in 3GPP UMTS, LTE (Long Term Evolution) and IEEE 802.16 that utilizes the same radio access scheme as the Frequency Division Duplex (FDD), i.e. in case of LTE OFDMA (Orthogonal Frequency-Division Multiple Access) in the downlink and the SC-FDMA (Single Carrier Frequency-Division Multiple Access) in the uplink, CDMA in case of UMTS and OFDMA in case of IEEE 802.16 in both uplink and downlink. Furthermore, TDD uses the same subframe format as well as the same configuration protocols as FDD. The main difference compared with FDD is that TDD macro cellular base stations, or evolved Node B (eNBs) in 3GPP terminology, support an unpaired frequency band, where downlink and uplink are separated in time domain, with each frame being composed by downlink (DL), uplink (UL) and special (S) sub-frames.

Special sub-frames are used to switch from downlink to uplink and they are included at least once within each frame. In particular, the special sub-frame consists of the following three special fields, a downlink part (DwPTS), a guard period (GP), and an uplink part (UpPTS). In 3GPP LTE, the UL/DL portion of each frame may be configured according to the specification provided in document 3GPP TS 36.300, Technical Specification Group Radio Access Network; Evolved Universal Terrestrial Radio Access (E-UTRA) and Evolved Universal Terrestrial Radio Access Network (E-UTRAN); Overall description; Stage 2 (Rel 10), April 2011, which defines 7 different UL/DL configuration modes as shown in the following table:

| | | Uplink-downlink allocations | | | | | | | | | |
|---|---|---|---|---|---|---|---|---|---|---|---|
| | Switch-point period- | Subframe number | | | | | | | | | |
| Configuration | icity | 0 | 1 | 2 | 3 | 4 | 5 | 6 | 7 | 8 | 9 |
| 0 | 5 ms | DL | S | UL | UL | UL | DL | S | UL | UL | UL |
| 1 | 5 ms | DL | S | UL | UL | DL | DL | S | UL | UL | DL |
| 2 | 5 ms | DL | S | UL | DL | DL | DL | S | UL | DL | DL |
| 3 | 10 ms | DL | S | UL | UL | UL | DL | DL | DL | DL | DL |
| 4 | 10 ms | DL | S | UL | UL | DL | DL | DL | DL | DL | DL |
| 5 | 10 ms | DL | S | UL | DL | DL | DL | DL | DL | DL | DL |
| 6 | 5 ms | DL | S | UL | UL | UL | DL | S | UL | UL | DL |

Despite the provision of flexibility in resource allocation, such asymmetric UL/DL brings new challenges in admission control and load balancing and introduces certain limitations due to interference reasons. In the case that two adjacent eNBs apply different UL/DL configuration models, it may happen that eNBs directly interfere each other, or UEs (User Equipment) are receiving direct interference from each other as illustrated in FIG. 1, where eNB A, serving User Equipment UE 1, is transmitting in DL towards UE 1, while eNB B, serving User Equipment UE 2, is receiving in UL from UE 2. Such a scenario results in cross-slot interference including eNB-to-eNB interference, which may prove significantly severe when a line of sight exists among eNBs. For UEs in close proximity, UE-to-UE interference is severe and difficult to handle also due to mobility. Due to physical limitations of the RF (Radio Frequency) frontend at eNBs and UEs, there is the need to avoid such cross-interference.

In particular, although UL/DL configuration may be configured according to traffic demand and changed dynamically to reflect traffic variations by altering the UL/DL frame portion, conventional interference control methods require neighbor eNBs to be synchronized following the same UL/DL configuration mode, which is a major barrier to flexibility. It can thus be noted that there is generally a trade-off between flexibility and interference, as also acknowledged in document Peter W. C. Chan, et. al., "The Evolution Path of 4G Networks: FDD or TDD?", IEEE Communication Magazine, Vol. 44, No. 12, December 2006. However, the dynamic UL/DL configuration mode is a desired feature of TD-LTE, as discussed in the document cited above as well as in document D. Astely, E. Dahlman, A. Furuskär, S. Parkvall, "TD-LTE—The radio-access solution for IMT-Advanced/TDD", CHINACOM, August 2010.

Previous efforts to provide cell-independent asymmetric UL/DL configuration, in which neighboring cells adopt a different UL/DL configuration, concentrate on evaluating loose UL/DL synchronization among neighboring cells like Adaptive TDD (as described, e.g., in G. Szladek, B. Heder, J. Bito, "Investigation of Interference conditions in BFWA System Applying Adaptive TDD", IEC, Prague, 2005) and further methods that utilize opportunistic interference mitigation (as described, e.g., in E. Foutekova, P. Agyapong, H. Haas, "Channel Asymmetry and Random Time Slot Hopping in OFDMA-TDD Cellular Networks", IEEE VTC Spring, Singapore, May 2008). Although such methods provide flexibility, their performance is subject to the degree of correlation of UL/DL configuration modes among neighboring cells as well as on the associated traffic load. Thus their use suit best cases where the UL/DL mode is similar with small sub-frame differences, providing only limited degree of flexibility.

An alternative method is the Hybrid Division Duplex (HDD), which combines both FDD and TDD schemes within each cell (described, e.g., in S. Yun, et.al., "Hybrid Division Duplex System for Next-Generation Cellular Services", IEEE Transactions on Vehicular Technology, Vol. 56, No. 5, September 2007) splitting each cell into two regions, with the outer macro cell region operating in FDD mode and the inner in TDD. HDD may resolve cross-slot interference for UEs located at the edge of each cell due to the use of the FDD, while being capable to provide cell-independent asymmetric UL/DL configurations among adjacent cells via the TDD mode. Such a proposal provides a high degree of UL/DL configuration mode flexibility, but it is subject to the use of FDD mode, which might not be available for certain deployment scenarios that rely solely on TDD.

Furthermore, US 2009/0249153 A1 discloses a dynamic adjustment of the UL/DL configuration mode with the purpose of introducing alternations of selected sub-frames for UL to DL or vice versa. The means of sub-frame adjustment is the introduction of a new sub-frame referred to as "mute"-sub-frame, where the eNB is neither in DL nor UL mode. Such a sub-frame is used to provide synchronization among neighboring cells/eNBs and/or associated UEs in order to introduce a sub-frame change, i.e. a dynamic UL/DL configuration adjustment, smoothly without interruption and performance degradation avoiding cross-slot interference. Such a method provides the means of concurrent dynamic adjustment of the UL/DL configuration mode among a set of neighboring cells or for an individual cell but is not addressing the problem of providing a different UL/DL configuration mode among neighboring cells or different network regions.

It is therefore an object of the present invention to improve and further develop a method and a system of the initially described type for resource management in a cellular communication network in such a way that a high degree of UL/DL configuration mode flexibility is provided without introducing significant cross-interference.

In accordance with the invention, the aforementioned object is accomplished by a method comprising the features of claim 1. According to this claim, such a method is characterized in that said base stations are operated such that neighboring base stations with adjacent and/or overlapping coverage areas employ different UL/DL configuration modes, wherein interference between neighboring base stations is taken account of by implementing power control on a subframe basis.

Furthermore, the aforementioned object is accomplished by a system characterized in that it comprises a management mechanism that controls the operation of base stations in such a way that neighboring base stations with adjacent and/or overlapping coverage areas employ different UL/DL configuration modes, wherein interference between neighboring base stations is taken into account by implementing power control on a subframe basis.

According to the invention it has first been recognized that the above mentioned trade-off between flexibility and interference can be resolved by allowing different individual base stations (or network regions, i.e. group of base stations) to operate at the same time in different access modes, i.e. UL or DL, while potential interference (or other performance degradations) is repressed by the way of controlling the transmission power for individual subframes. Specifically, a management mechanism is provided that controls the operation of neighboring base stations in such a way that they may be assigned different UL/DL configuration modes, while subframe power control allows for interference-decoupling between those base stations with different patterns. Thus, the method according to the invention reduces or even avoids cross-interference between base stations and UEs. Power control may also apply UL/DL patterns including phases with neither UL nor DL such that cross-interference is avoided.

The method according to the invention provides a higher degree of flexibility compared to adaptive TDD and to opportunistic interference mitigation, relies only on TDD deployment and its objective is not limited to adjusting the UL/DL configuration but to configure dynamically different UL/DL modes into neighboring cells and regions. Thus, the main advantage of this invention is that it allows for different UL/DL configurations among neighbor cells in TD-LTE enhancing the network performance. In this way the network resources are exploited more efficiently, e.g. by matching the traffic/resource demand with the UL/DL configuration mode, thereby capturing diverse and evolving traffic demands. Such solution should follow the Self-Organized Network (SON) paradigm, as described in document 3GPP TR 36.902, Evolved Universal Terrestrial Radio Access Network (E-UTRAN); Self-configuring and self-optimizing network (SON) use cases and solutions, April 2011, being a part of the eNB self-configuration process upon a new eNB installation and may also re-configure an existing UL/DL mode based on dynamic traffic conditions.

According to a preferred embodiment base stations may be configured to identify those subframes which are potentially subject to interference. Hereinafter, such subframes will be briefly denoted "potentially interfering subframes". Essentially, cross-interference will occur in situations in which a base station has two neighboring base stations with adjacent and/or overlapping coverage areas that employ a different UL/DL configuration mode. For instance, one of the neighboring base stations may operate in UL, while in the same subframe another of the neighboring base stations operates in DL. In such case, a base station would identify its respective subframe as potentially interfering subframe.

Advantageously, once potentially interfering subframes have been identified, a base station may perform power control for these subframes. In a specific embodiment it may be provided that a base station reduces its transmission power for such subframes, either dynamically or by a predefined amount. In certain situations, e.g. in cases of high traffic load, potentially interfering subframes can be made completely "silent", which means that the base station does not at all transmit or receive in such subframes. In such case the respective base station functions as a kind of "buffer" base station between two neighboring base stations that operate in different UL/DL configuration modes.

According to a further preferred embodiment a base station, in case a potentially interfering subframe is a special S subframe, keeps using the DL part of said S subframe, provided a neighboring base stations with adjacent and/or overlapping coverage area also employs a DL subframe. The reason is the fact that a DL part of a special S frame is like a conventional DL subframe, while the same does not hold for the UL part since this contains additional synchronization information.

With respect to an efficient implementation of power control it may be provided that subframes with a fixed maximum power are introduced. The fixed maximum power may be specified on the basis of a preceding training phase. According to another embodiment power control may be implemented by introducing time-zones with different maximum power, wherein UEs are scheduled to these time-zones depending on their long-term Signal-to-Noise Ratio SNR (Signal-to-Noise Ratio). Again, a respective preceding training phase for specifying maximum power may be performed.

Additionally or alternatively, power control may include performing per-frame signaling among potentially interfering base stations and adjusting power sequentially for the purpose of interference cancellation.

According to another embodiment power control may include controlling the maximum power depending on the backhaul capacity and/or the number of UEs being served by the involved base stations. According to still another embodiment power control may include excluding parts of the spectrum in the DL. Sparing out parts of the spectrum in the DL reduces also the emitted power in time-domain and avoids the problem that the useful signal is either "drowned"

in noise or the automatic gain-control reaches the saturation region, i.e. FR>1 at one base station to avoid drowning a UE at the other base station in the UL.

Beside the regulation of sub-frame transmission, the introduction of a different UL/DL configuration mode among certain neighbor base stations requires also a process of selecting the optimal UL/DL configuration mode for each base station. In a specific embodiment the UL/DL configuration mode selection may be performed cooperatively among base stations based on information provided by a central network management entity and/or by the base stations themselves. In particular, this information may include details about an expected resource demand, which may be determined for each base station on the basis of an estimation and/or forecasting of the traffic volume associated with the respective base station. Once a certain UL/DL resource demand is associated with each base station, different centralized or distributed methods may be applied to select the optimal UL/DL configuration mode, either to provide an initial solution part of a configuration phase or as a (dynamic) adjustment to an existing configuration.

In this regard it is important to note that the UL-DL ratio not only depends on the data/resource demand, but also on channel condition and therefore the UL-DL ratio may vary depending on location and geographical characteristics.

In order to enable dynamic managing of the UL/DL configuration mode and to allow for fast and effective adaptations a monitoring process may be implemented that keeps track of the evolving traffic demands to identify major alternations or QoS degradation. According to a preferred embodiment a monitoring mechanism is provided in which the base stations monitor traffic load in the UL and/or in the DL for locations within their respective coverage areas. This monitoring mechanism may be carried out using UE positioning techniques, e.g., the ones described in document 3GPP TS. 25.111, Technical Specification Group RAN; LMU performance specification; UE positioning in UTRAN, (Rel 9), December 2009. Upon a major change in traffic, which may be identified according to predefined criteria, a different UL/DL configuration mode may be computed. Oscillations among specific UL/DL configuration modes may be avoided by introducing a hold down timer within each UL/DL configuration mode, which prohibits changes of UL/DL configuration modes for predefined time durations. This would also reduce the minimum re-computation period.

Advantageously, the UL/DL configuration mode selection and adaptation may be performed by iterative adjustments. For instance, base stations may be allowed to iteratively adjust the UL/DL configuration depending on the QoS demands and how those demands were fulfilled. This process may be an iterative feedback-loop by allowing base stations to adjusting their UL/DL mode/pattern based on the selection of adjacent base stations. Currently selected UL/DL configuration modes may be communicated among base stations, in particular via the X2 interface in case of 3GPP, and/or towards an associated OAM (Operation, Administration and Maintenance), in particular via the N-Inf.

With respect to enhancing scalability a clustering step may be provided according to which base stations with identical or similar UL/DL resource demands and/or geographical properties are grouped to form a cluster. The UL/DL configuration mode selection (inclusive of the iterative improvement techniques described above) may then be performed on the level of the clusters rather than considering individual base stations. This could speed up the selection of UL/DL configuration patterns and may reduce the required overhead. The degree of similarity may be subject to pre-adjustment or may be changed dynamically depending on the current situations.

According to an embodiment varying the UL/DL Configuration Modes may be performed via the means of interference management. It should be noted that this approach is not as efficient as the previously described approaches, but may prove to be a good solution in certain scenarios, for instance in energy saving scenarios, where the unused spectrum helps base stations to switch off certain local components. Similarly to the previously described approaches, this scheme also assumes that certain base stations may have available resources to perform the re-scheduling of certain resources.

At off-peak times the present invention may also contribute to enhance the energy saving and the efficiency of resource utilization within TD-LTE by introducing a different UL/DL configuration mode among neighbor base stations. According to an embodiment an OAM (Operation, Administration and Maintenance) function is provided that is responsible for monitoring the network and for identifying off-peak period as well as keep track of the initial adjustment of the UL/DL configuration mode. It may be provided that during off-peak times a mode is selected with a higher ratio of UL-subframes in which base stations may turn off their RF frontend. Consequently, by increasing the share of UL frames and turning off RF frontends the overall energy consumption can be significantly reduced. This further allows for serving a higher number of devices with strong UL-demands, such as M2M applications.

The purpose of such UL/DL configuration mode adjustment process is to align base stations with similar traffic demands by assigning to them the same UL/DL configuration providing synchronization to avoid interference, to avoid interference among neighbor base stations with different traffic demands, and to switch off as many unused carriers and/or radio resource as possible to save energy. Thus, this embodiment is similar to the ones described above with an additional parameter being energy saving by switching-off unused carriers.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawing FIG. 1 is a schematic view of a cellular communication network that illustrates the problem of cross-slot interference in TDD systems, FIG. 2 is a schematic view of a cellular communication network that illustrates the establishment of UL/DL configuration modes in accordance with an embodiment of the present invention, and FIG. 3 is a flow diagram that illustrates an UL/DL configuration mode selection algorithm in accordance with an embodiment of the present invention.

It should be noted that even though hereinafter practical details and embodiments of the present invention concentrate on 3GPP LTE scenarios, the same principles apply to any other TDD system.

Figure 2:
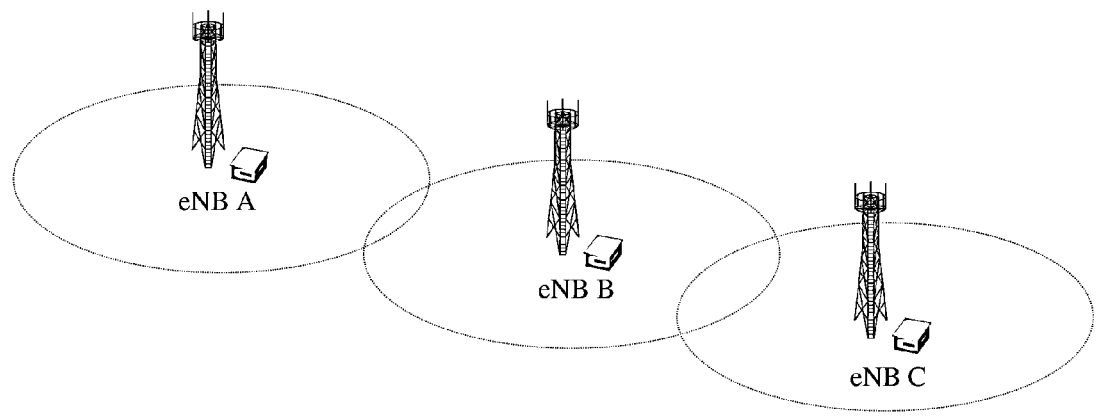
Figure 3:
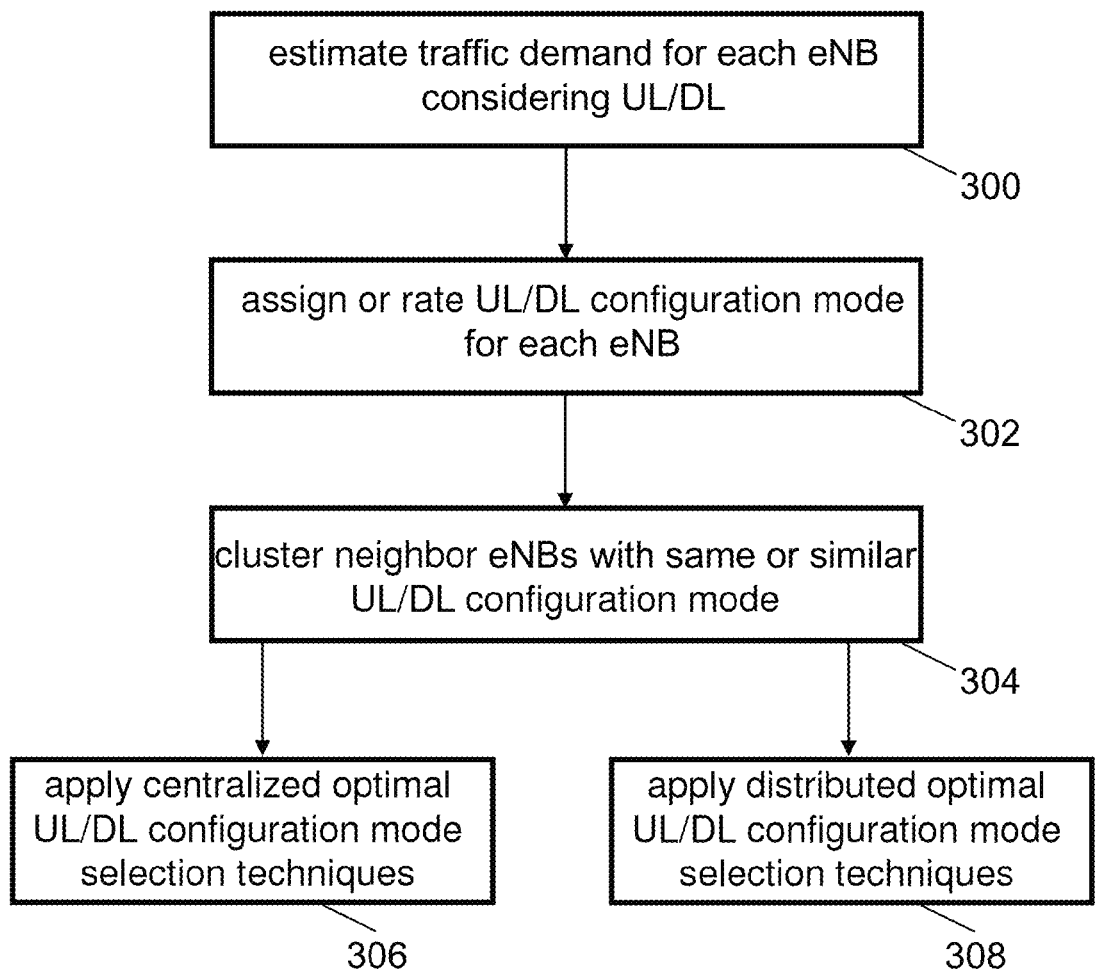

The lower part of FIG. 2 illustrates a cellular communication network which implements a method for varying the UL/DL Configuration Modes via Transmission Regulation in accordance with the present invention. For the sake of simplicity, only three base stations—eNB A, eNB B, and eNB C—are depicted, even though in real application scenarios typically a much higher number of base stations will be involved, as will be easily appreciated by those skilled in the art. The coverage area of the respective cells is indicated by the elliptic curves.

In the scenario illustrated in FIG. 2, eNB A and eNB C are configured with different UL/DL configuration modes, illustrated in the upper part of FIG. 2. As described initially in connection with FIG. 1, such configuration may cause severe interference. In the example of FIG. 2, cross-interference would occur either between eNB A and eNB B, which is located between eNB A and eNB C and which has adjacent or at least partly overlapping coverage areas with respect to the base stations, or between eNB C and eNB B, depending on the respective UL/DL configuration mode implemented by eNB B. Potentially interfering TDD UL/DL configuration modes, i.e. subframes that are potentially subject to interference, are subframes 3, 4, 6, 7, 8, and 9, since eNB A and eNB C employ different access modes in these subframes.

In order to mitigate this problem, in accordance with embodiments of the present invention, eNB B either controls the transmission power or completely restricts UL and DL transmission for subframes 3, 4, 6, 7, 8, and 9 that may create interference for eNB A and eNB C. In FIG. 2, the latter solution is indicated by the hatched areas in the respective subframes. A main assumption of the proposed solution is the fact that certain eNBs may reduce the transmission power or do not transmit or receive in "silent" sub-frames without significantly affecting the user performance. This may be accomplished when a significant number of UEs is within the core region of the cell/eNB or when there is no need to utilize all available resources due to lower traffic demands providing the opportunity for other neighbor eNBs to employ different UL/DL configurations.

A specific embodiment of the present invention is illustrated in subframe 6 of FIG. 2, where eNB A has set up a special S subframe, whereas eNB C operates in DL. In this case, eNB B may also set up a special S subframe, and it may use the DL part of this frame, which is possible since it is synchronized with the other neighbor eNB, namely eNB C in the scenario of FIG. 2, which also uses a DL subframe. In this regard it is important to note that a DL part of a special frame is like a conventional DL subframe, while the same does not hold for the UL part since this contains additional synchronization information.

FIG. 3 is a flow diagram that illustrates an algorithm for selecting an optimal UL/DL configuration mode in accordance with an embodiment of the present invention. In a first step, indicated at 300, the traffic/resource demand is estimated for each eNB. This estimation may be accomplished by, e.g., relying on UE positioning techniques, and it may be carried out both for the traffic load in the UL and in the DL. In a next step, indicated at 302, each eNB is assigned or rated a UL/DL configuration mode according to the traffic demand estimated in step 300. Furthermore, indicated at step 304, neighbor eNBs having assigned the same or a similar UL/DL configuration mode are having similar geographical properties may be grouped to form clusters, which enhances scalability since improvement techniques for UL/DL configuration mode adaptation can be applied on a cluster basis rather considering individual eNBs.

Once the above steps are completed, centralized 306 or distributed 308 optimal UL/DL configuration mode selection techniques may be applied. For instance, a centralized approach may start from the highest load cluster or eNB (in case no clustering step 304 is carried out) and may select an optimal UL/DL configuration mode for this cluster/eNB. Next, neighbor clusters/eNBs may be examined, i.e. the next lower load neighbor cluster or eNB may be determined and the optimal UL/DL configuration mode for such cluster or eNB may be selected. This process may be repeated until an optimal UL/DL configuration mode is selected for each cluster/eNB under consideration. In a next step, the selected UL/DL configuration modes may be adjusted with respect to neighbors until all neighbors are examined. Then, the next highest load cluster or eNB may be selected, continuing until all of them are considered.

Distributed approaches may consider only a neighbor clusters or eNBs so the same process is applicable considering only a neighboring scope.

Embodiments that include the deployment of interference management methods UL/DL configuration mode selection may follow the same process. However, instead of selecting the optimal UL/DL configuration mode for clusters and eNBs, they may schedule the neighbor cluster or eNB resources within different spectrum bands.

For energy saving the same steps as described above may be considered, followed by an additional step that aims to switch off the carriers or other eNB component that are not in use.

It should be noted that the power control schemes may also be combined with the interference management mechanisms in order to maximize the resource utilization benefits.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. Method for resource management in a cellular communication network, wherein said network includes at least one base station per cell for a plurality of cells that operates in TDD (Time Division Duplex) transmission mode, wherein said base stations implement a respective UL/DL configuration mode in which frames are composed of a specific sequence of downlink DL, uplink UL and special S subframes, which comprises
   operating said base stations such that neighboring base stations with adjacent and/or overlapping coverage areas employ different UL/DL configuration modes, and taking into account interference between neighboring base stations by implementing power control on a subframe basis,
   wherein said power control is implemented by introducing subframes with a fixed maximum power, and
   wherein a base station identifies those subframes as potentially interfering subframes for which at least two other base stations with adjacent and/or overlapping coverage areas employ a different UL/DL configuration mode, and wherein the base station performs power control for said potentially interfering subframes.

2. Method according to claim 1, wherein the base station identifies those subframes—potentially interfering subframes—which are potentially subject to interference.

3. Method according to claim 1, wherein the base station performs power control for potentially interfering subframes, by reducing its transmission power for said potentially interfering subframes.

4. Method according to claim 1, wherein the base station, in case a potentially interfering subframe is an S subframe, keeps using the DL part of said S subframe, provided a neighboring base stations with adjacent and/or overlapping coverage area also employs a DL subframe.

5. Method according to claim 1, wherein said power control is implemented by introducing time-zones with different maximum power, wherein UEs are scheduled to these time-zones depending on their long-term Signal-to-Noise Ratio SNR.

6. Method according to claim 5, wherein said maximum power is specified on the basis of the results of a training phase.

7. Method according to claim 1, wherein said power control includes performing per-frame signaling among potentially interfering base stations and adjusting power sequentially.

8. Method according to claim 1, wherein said power control includes controlling the maximum power depending on the backhaul capacity and/or the number of UEs being served by the involved base stations.

9. Method according to claim 1, wherein said power control includes excluding parts of a spectrum in the DL.

10. Method according to claim 1, wherein UL/DL configuration mode selection is performed cooperatively among base stations based on information provided by a central entity and/or by the base stations themselves.

11. Method according to claim 1, wherein a respective resource demand is determined for said base stations on the basis of an estimation and/or forecasting of the traffic volume associated with said base stations.

12. Method for resource management in a cellular communication network, wherein said network includes at least one base station per cell for a plurality of cells that operates in TDD (Time Division Duplex) transmission mode, wherein said base stations implement a respective UL/DL configuration mode in which frames are composed of a specific sequence of downlink DL, uplink UL and special S subframes, which comprises operating said base stations such that neighboring base stations with adjacent and/or overlapping coverage areas employ different UL/DL configuration modes, and taking into account interference between neighboring base stations by implementing power control on a subframe basis, wherein a monitoring is performed that keeps track of evolving resource demands.

13. Method according to claim 1, wherein oscillations among different UL/DL configuration mode are avoided by way of introducing a hold down timer for each UL/DL configuration mode.

14. Method according to claim 1, wherein UL/DL configuration mode selection is performed by iterative adjustments.

15. Method according to claim 14, wherein said iterative adjustments are made depending on QoS demands and the fulfillment of said QoS demands.

16. Method according to claim 1, wherein base stations adjust their UL/DL configuration mode based on the UL/DL configuration mode selected by neighboring base stations with adjacent and/or overlapping coverage areas.

17. Method according to claim 1, wherein selected UL/DL configuration modes are communicated among base stations and/or towards an associated OAM.

18. Method according to claim 1, wherein base stations with identical or similar UL/DL resource demands and/or geographical properties are grouped to form a cluster, wherein UL/DL configuration mode selection is performed on the level of said clusters.

19. Method according to claim 1, wherein UL/DL configuration mode selection is performed by means of interference management.

20. Method according to claim 1, wherein UL/DL configuration modes with an increased ratio of UL-subframes are selected during off-peak times.

21. Resource management system for use in a cellular communication network, wherein said network includes at least one base station per cell for a plurality of cells that operates in TDD (Time Division Duplex) transmission mode, wherein said base stations are configured to implement a respective UL/DL configuration mode in which frames are composed of a specific sequence of downlink DL, uplink UL and special S subframes, wherein the system comprises a management mechanism that controls the operation of base stations in such a way that neighboring base stations with adjacent and/or overlapping coverage areas employ different UL/DL configuration modes, wherein interference between neighboring base stations is taken into account by implementing power control on a subframe basis, and wherein said power control is implemented by introducing subframes with a fixed maximum power and a base station identifies those subframes as potentially interfering subframes for which at least two other base stations with adjacent and/or overlapping coverage areas employ a different UL/DL configuration mode, and the base station performs power control for said potentially interfering subframes.

22. Resource management system for use in a cellular communication network, wherein said network includes at least one base station per cell for a plurality of cells that operates in TDD (Time Division Duplex) transmission mode, wherein said base stations are configured to implement a respective UL/DL configuration mode in which frames are composed of a specific sequence of downlink DL, uplink UL and special S subframes, wherein the system comprises a management mechanism that controls the operation of base stations in such a way that neighboring base stations with adjacent and/or overlapping coverage areas employ different UL/DL configuration modes, wherein interference between neighboring base stations is taken into account by implementing power control on a subframe basis, and wherein a monitoring is performed that keeps track of evolving resource demands.

* * * * *